United States Patent [19]

Daugherety, Jr. et al.

[11] Patent Number: 5,172,819
[45] Date of Patent: Dec. 22, 1992

[54] BEARING ASSEMBLY FOR AN ARTICULATED COUPLING APPARATUS WHICH CONNECTS ADJACENT ENDS OF A PAIR OF RAILWAY CARS TOGETHER

[75] Inventors: David W. Daugherety, Jr., Bolingbrook; Wajih Kanjo, Lockport, both of Ill.; Michael G. Hawryszkow, Munster, Ind.; William D. Wallace, Chicago, Ill.; Edward G. Lynch, Jr., Saugus, Calif.

[73] Assignees: Westinghouse Air Brake Company, Wilmerding, Pa.; Sargent Industries, Inc., Waukesha, Wis.

[21] Appl. No.: 894,727

[22] Filed: Jun. 2, 1992

Related U.S. Application Data

[63] Continuation of Ser. No. 521,861, May 8, 1990, abandoned.

[51] Int. Cl.[5] .............................................. B61G 5/02
[52] U.S. Cl. ................................. 213/75 R; 105/3; 213/62 R; 403/57; 403/76; 403/131
[58] Field of Search ........................ 105/3, 4.1, 4.2; 213/62 R, 74, 75 R, 50; 280/411; 180/134; 403/57, 74, 76, 131

[56] References Cited

U.S. PATENT DOCUMENTS

| | | | |
|---|---|---|---|
| 1,574,461 | 2/1926 | Witsberger | 280/511 |
| 1,826,853 | 10/1931 | Williams et al. | 105/3 |
| 2,013,546 | 9/1935 | Wallace | 105/3 |
| 2,286,590 | 6/1942 | Van Dorn | 213/50 X |
| 2,998,268 | 8/1961 | Witter | 280/511 X |
| 3,396,673 | 8/1968 | Livelsburger et al. | 213/75 R X |
| 3,525,448 | 5/1968 | Bauer | 403/57 X |
| 4,243,192 | 1/1981 | Johnson | 403/131 X |
| 4,258,628 | 3/1981 | Altherr | 213/75 R X |
| 4,593,829 | 6/1986 | Altherr | 213/75 R |
| 4,867,071 | 9/1989 | Weber . | |

Primary Examiner—Robert J. Oberleitner
Assistant Examiner—S. Joseph Morano
Attorney, Agent, or Firm—J. O. Ray, Jr.

[57] ABSTRACT

The present invention provides a bearing assembly for use in an articulated coupling apparatus which connects one end of one railway car to an adjacent end of a second railway car in a semipermanent manner. Such coupling apparatus includes a male connection member, a female connection member, and a device for securing such bearing assembly to the coupling apparatus.

21 Claims, 4 Drawing Sheets

BEARING ASSEMBLY FOR AN ARTICULATED COUPLING APPARATUS WHICH CONNECTS ADJACENT ENDS OF A PAIR OF RAILWAY CARS TOGETHER

This is a continuation of application Ser. No. 07/521,861, filed May 8, 1990 now abandoned.

FIELD OF THE INVENTION

The present invention relates, in general, to railway car coupling devices and, more particularly, this invention relates to a bearing assembly used in an articulated-type coupling device which connects one end of a first railway car to an adjacent predetermined end of a second railway car, in a semipermanent manner, and which enables all standard size railway cars presently in use by the railway industry to negotiate all known curves in present track structures.

BACKGROUND OF THE INVENTION

Prior to the present invention, in the railroad industry it has been well known for many years to use standard couplers which were approved by the Association of American Railroads (AAR) to connect together adjacent ends of a pair of railway cars. In this application, for example, such couplers are designed to facilitate both the connecting and disconnecting of individual railway cars. These couplers enable such cars to be readily combined to make up a train consist, or to be individually separated, as required, for loading and unloading purposes.

In more recent times, however, such railroad industry has discovered that the interconnecting of several railway cars to form a generally semipermanent unit has a number of important advantages. Particularly, for example, railroad cars adapted for use in "piggyback" service have been joined in this manner to advantage. The railroad cars which are joined in such semipermanent fashion are commonly referred to in the railroad industry as a "10-pack". These 10-pack units do not require the use of the standard coupler, except between units. The primary reason such standard couplers are not required is because these 10-pack units are only broken periodically. Normally, this occurs when maintenance of an individual component must be carried out. Obviously, considerable cost-savings are achieved by this semipermanent coupling arrangement. These cost-savings are mainly derived from lower car weight, fewer railway trucks, reduced maintenance, and generally lower equipment cost. Such lower equipment cost being achieved by elimination of draft gears and a reduction in the number of trucks required.

With the use of these semipermanent coupling arrangements and with the higher loads presently being carried by modern railway trains, it is of the utmost importance that a close-buttoned relationship be maintained between the numerous coupler draft components. Such close-buttoned relationship is required to reduce the effects of the impact forces which are encountered by a car under buff conditions of train operations.

One prior type of articulated coupling device used for the purpose of connecting adjacent ends of a pair of railway cars, in a semipermanent manner, is taught in U.S. Pat. No. 4,258,628. This particular articulated coupling device includes a male connection member secured to one end of a first railway car body, and a female connection member secured to an adjacent end of a second railway car body. The female connection member, in this arrangement, is rotatably-engaged in a center plate bowl of a bolster of a railroad car truck in a manner that is well known in the railway art. The outer end of the male connection member is disposed for movement in a cavity formed in the outer end of such female connection member. Both the male and female connection members are joined, in a semipermanent manner, by a pin member. One important disadvantage in this arrangement is that this pin member is positioned in a vertical direction and disposed in aligned apertures formed in each of the male and female connection members. The aperture formed in the male connection member for receiving the pin member must be somewhat larger than the pin member itself to allow certain required movements. A rear surface portion of the aperture formed in the male connection member for receiving the pin member has a horizontal concave configuration and a vertical convex configuration. This configuration enables both the male connection member and the female connection member to move in each of a horizontal direction and a vertical direction in relationship to one another while, at the same time, providing a relatively substantial area of surface contact between the rear surface of the pin aperture and the pin member.

Another disadvantage in this coupling arrangement is that the outer end surface of the outer end of the male connection member must include a convex configuration which abuts against a complimentary concave surface formed on a front face of a follower member. In this coupling device, the follower member is carried within the rear portion of the cavity formed in the other end portion of the female connection member. A pair of vertically-disposed, slot-like cavities are formed on the rear face of such follower member. Each of these vertical slots has a resilient element disposed therein which protrudes outwardly from such follower member. The exposed outer surface of each such resilient element is engaged by a vertically-disposed wedge element. Such wedge element is provided to urge the follower member and the male connection member forward. In this manner, the rear surface portion of the aperture formed in the male connection member is maintained substantially in contact with the pin member at all times.

Such contact is necessary in these prior art articulated coupling devices, because most of the articulated connecting parts are cast members. In order to reduce the cost of this coupling device, the cast members receive very little, if any, finish-machining to provide the necessary or desired dimensional control. As a result of this, it is rather difficult to provide an articulated coupling device which is self-adjusting under various wear conditions to minimize the slack in the various connections encountered during service. Other prior art articulated coupling devices are taught in U.S. Pat. No. 3,716,146 and Canadian Patent No. 1,231,078.

SUMMARY OF THE INVENTION

The present invention provides a bearing assembly for use in an articulated coupling arrangement. Such articulated coupling arrangement being utilized to connect adjacent predetermined ends of a pair of railway cars together, in a substantially semipermanent manner. The articulated coupling arrangement has a male connection member secured to one predetermined end of a first railway car and a female connection member secured to an adjacent predetermined end of a second railway car. Such bearing assembly includes a substantially spherical member. Such spherical member having a predetermined diameter. A race assembly formed by at least two members is provided. Each of such at least two members, which form the race assembly, have a substantially spherical inner surface. This inner surface is positioned around a predetermined portion of the spherical member. An outer surface of such race assembly has a substantially identical size and a substantially identical configuration as a predetermined size and predetermined configuration of an aperture formed in one end of such male connection member when such at least two members forming such race assembly are positioned around such predetermined portion of such spherical member. Such race assembly enables requisite movement of such male connection member in relation to such female connection member in each of a vertical direction and a horizontal direction over a predetermined range of angles measured from each of a centerline of such spherical member disposed in a vertical direction and a longitudinal axis of such articulated coupling arrangement disposed in a horizontal direction. There is a securing means provided which is engageable with each of such race assembly and such male connection means for securing such race assembly and such spherical member to such second end of such male connection member. The final essential element of such bearing assembly is a pair of shaft members. Such shaft members extend outwardly a predetermined length from axially-opposed surfaces of such spherical member.

A longitudinal axis of such pair of shaft members being in a substantially horizontal plane. One of such pair of shaft members being engageable with a respective one of an opening formed through each of a pair of upstanding side wall portions of a cavity formed in one end of such female connection member. At least a portion of each of such pair of shaft members having a substantially identical configuration as at least a portion of a predetermined configuration of such opening formed through such side wall portion of such cavity.

OBJECTS OF THE INVENTION

It is, therefore, one of the primary objects of the present invention to provide a bearing assembly for use in an articulable coupling apparatus for connecting adjacent ends of a pair of railway cars together, in a semipermanent manner, which requires fewer components.

Another object of the present invention is to provide a bearing assembly for use in an articulable coupling apparatus for connecting adjacent ends of a pair of railway cars together, in a semipermanent manner, in which a minimum number of components must move relative to one another during operation of such railway cars.

Still another object of the present invention is to provide a bearing assembly for use in an articulable coupling apparatus for connecting, in a semipermanent manner, the adjacent ends of a pair of railway cars together which is relatively simple to assembly and disassemble.

A further object of the present invention is to provide a bearing assembly for use in an articulable coupling apparatus for connecting, in a semipermanent manner, the adjacent ends of a pair of railway cars together, which can be adapted to any of the presently approved lengths for such railway cars, and which can operate on all of the various curves in the tracks in use at the present time.

An additional object of the present invention is to provide a bearing assembly for use in an articulable coupling apparatus for connecting adjacent ends of a pair of railway cars together. In a semipermanent manner, which can be more easily maintained in proper working order.

Yet another object of the present invention is to provide a bearing assembly for use in an articulable coupling apparatus for connecting adjacent ends of a pair of railway cars together, in a semipermanent manner, which requires a minimum amount of machining of the finished components.

Another object of the present invention is to provide a bearing assembly for use in an articulable coupling apparatus for connecting, in a semipermanent manner, the adjacent ends of a pair of railway cars together, which generally will be lighter in weight than presently used articulated coupling devices.

Still yet another object of the present invention is to provide a bearing assembly for use in an articulable coupling apparatus for connecting adjacent ends of a pair of railway cars together, in a semipermanent manner, which will be cost-effective for the railway industry.

In addition to the above-described objects and advantages of the bearing assembly for use in an articulable coupling apparatus, various other objects and advantages of the present invention will become more readily apparent to those persons who are skilled in the railway coupling art, from the following more detailed description of the invention, particularly when such description is taken in conjunction with the attached drawing figures and with the appended claims.

BRIEF DESCRIPTION OF THE INVENTION

Figure 1:
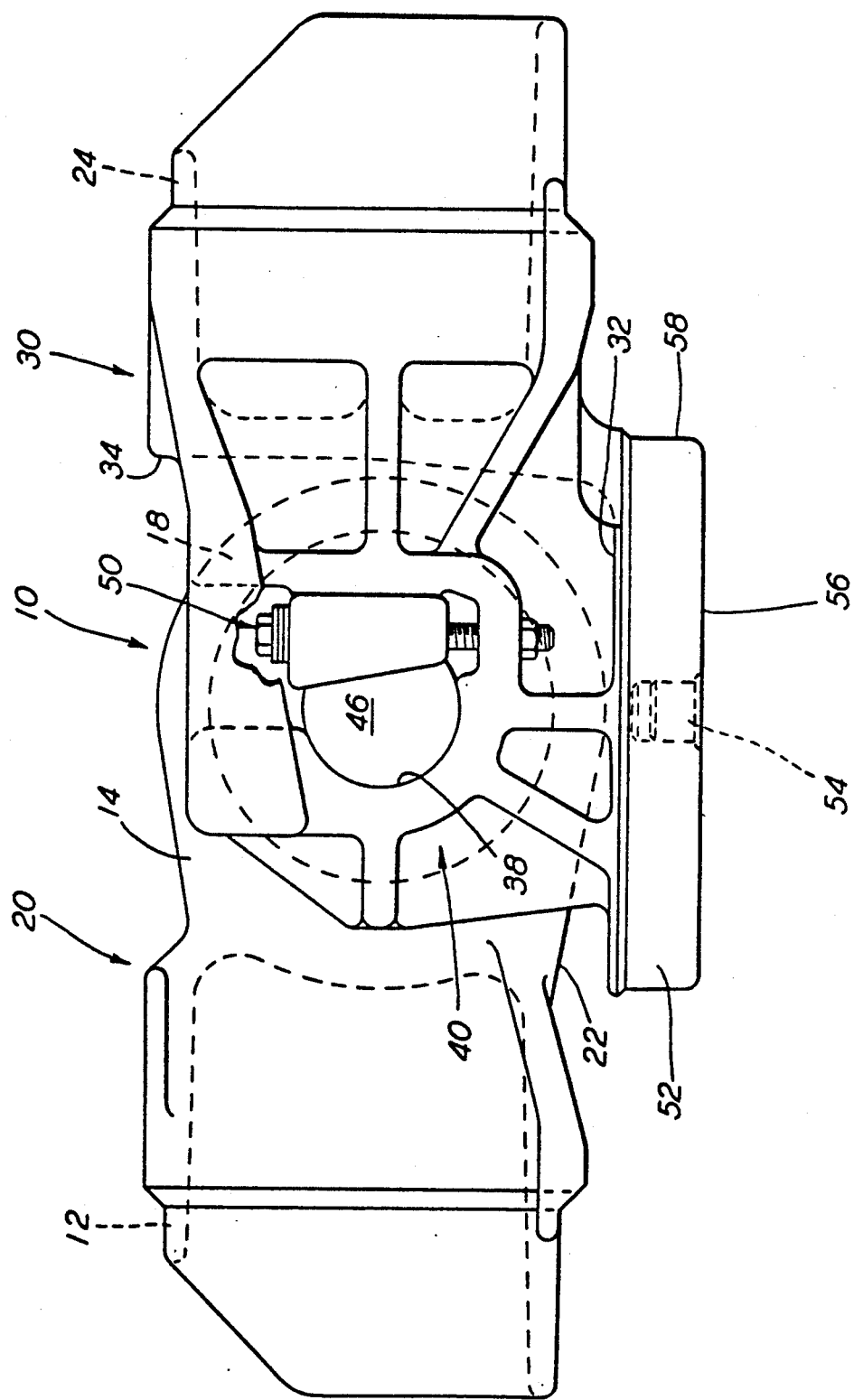
FIG. 1 is a side elevation view, partially in cross-section, which illustrates one presently preferred embodiment of a bearing assembly constructed according to the present invention for use in an articulable coupling apparatus.

Prior to proceeding to the more detailed description of the instant invention, it should be noted that in each of the several views illustrated in the drawings identical components which have identical functions have been identified, for the sake of clarity, with identical reference numerals.

Figure 2:
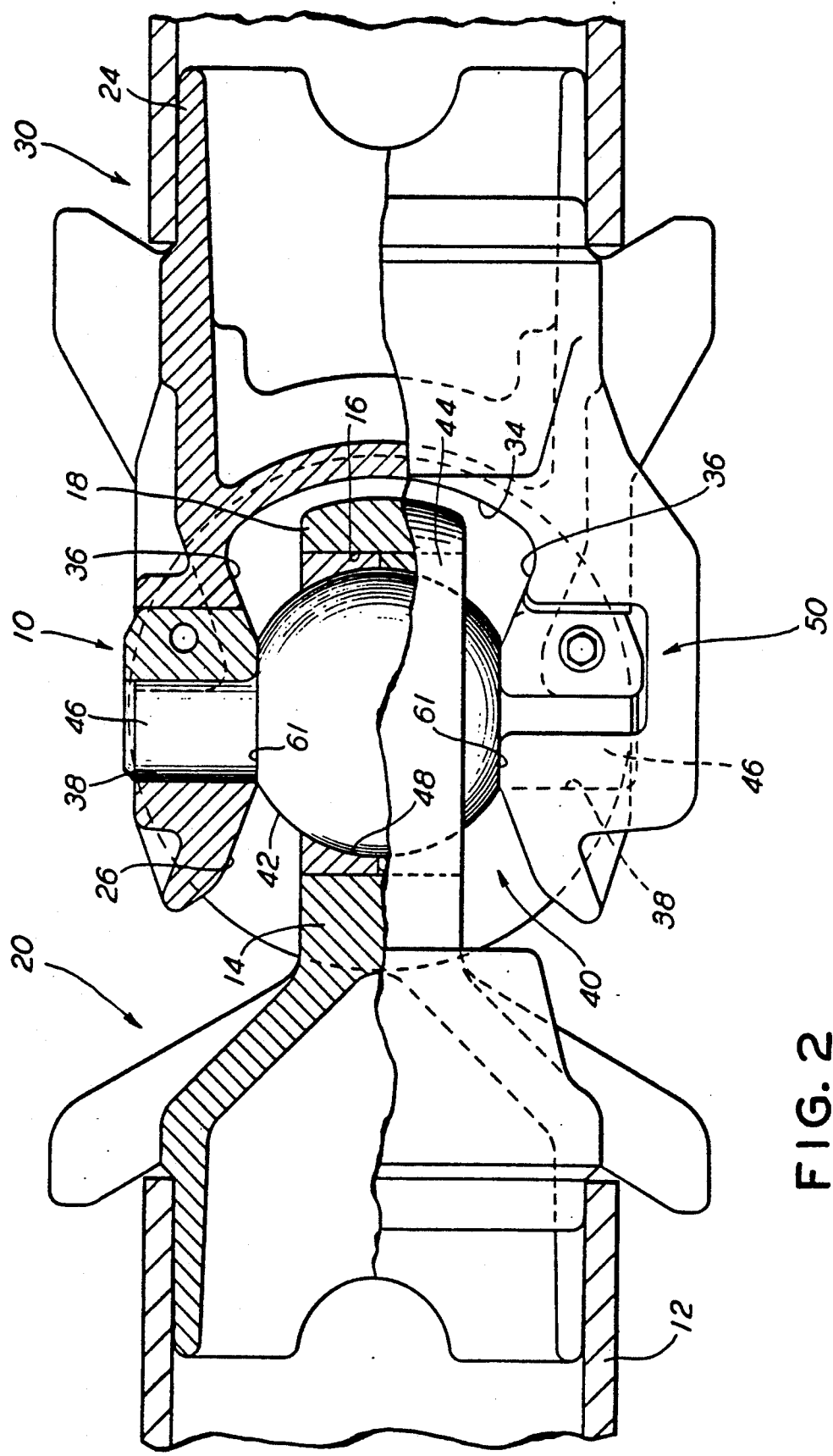
FIG. 2 is a top view, partially in cross-section, of the bearing assembly illustrated in FIG. 1.

Now refer more particularly to FIGS. 1 and 2 in which there is illustrated one presently preferred embodiment of a bearing assembly for use in an articulated coupling apparatus, generally designated 10, that is constructed in accordance with the principals of the present invention. This articulable-type coupling apparatus 10 can be retrofitted to existing railway cars, if desired, and is capable of connecting together, in a substantially semipermanent manner, at least one predetermined end of a first railway car (not shown) to an adjacent predetermined end of a second railway car (not shown).

Such articulated coupling apparatus 10 generally includes a male connection member, generally designated 20, a female connection member, generally designated 30, a bearing assembly, constructed according to this invention and generally designated 40, and a means, generally designated 50 for securing the bearing assembly 40 to such articulated coupling apparatus 10 in a semipermanent fashion.

The male connection member 20 is adapted at a first end 12 thereof in a manner that will enable such male connection member 20 to be engaged with and connected to one predetermined end of a center sill member (not shown) disposed substantially along a longitudinal centerline of one of such first railway car and such second railway car.

Prior to being secured in place, preferably by welding, such first end 12 of the male connection member 20 is positioned within the center sill portion for a predetermined distance. Usually such predetermined distance will be about 6 to 10 inches and about 8 inches being preferred and typical. Because such first end 12 of the male connection member 20 must fit within the center sill portion of the railway car, its outer dimensions are substantially controlled by the inner dimensions of such center sill portion. The second end 14 of such male connection member 20 is generally an elongated rectangular-shaped element. The outermost end 18 of such second end 14 of the male connection member 20 has a convex shape in a plane which extends in both a vertical direction and a horizontal direction. In addition, the bottom wall portion 22 of such second end 14 of the male connection member 20 is tapered upwardly starting from a predetermined position and extending toward such first end 12. Such tapered portion has a taper of at least about 10 degrees. The purpose of this tapered portion of such bottom wall 22 of the male connection member 20 is to allow flexing in a horizontal plane when the cars are moving over hilly terrain.

Disposed within such second end 14 of the male connection member 20 is an aperture 16, the purpose of which will become clear as the description of the articulated coupling apparatus 10 proceeds. The aperture 16 includes a predetermined size and a predetermined shape. Such aperture 16 is formed through a predetermined portion of the second end 14 of such male connection member 20. This aperture 16 has a longitudinal axis that is disposed transverse to a longitudinal axis of such male connection member 20 and lies in a substantially horizontal plane.

The female connection member 30 includes a first end 24 which is configured in a manner that will enable such female connection member 30 to be engaged with and connected to an adjacent predetermined end of a center sill member (not shown) disposed substantially along a longitudinal centerline of an opposite one of such first railway car and such second railway car (not shown).

A cavity 26 is formed in a second end of the female connection member 30. This cavity 26 receives therein at least a portion of each of the second end 14 of such male connection member 20 and such aperture 16 formed through the predetermined portion of such second end 14 of the male connection member 20. This cavity 26 is formed by a substantially horizontally-disposed bottom wall portion 32, a substantially vertically-disposed back wall portion 34 connected along a bottom edge thereof to a rear edge of such bottom wall portion 32, and a pair of vertically-disposed side wall portions 36 connected along a bottom edge thereof to the bottom wall portion 32 and along a rear edge thereof to such back wall portion 34. A vertically-disposed plane which intersects a geometric centerline of each respective one of such pair of side wall portions 36 being substantially parallel to each other. An inner surface of each of such bottom wall portion 32 and such rear wall portion 34 and such pair of side wall portions 36 define a predetermined size and a predetermined shape of the cavity 26 which is open adjacent a top and front surface thereof.

An opening 38 is formed through a predetermined portion of each one of the pair of side wall portions 36. Each opening 38 at least includes a slot-like portion adjacent an upper surface of a respective side wall portion 36. Such each opening 38 has a predetermined configuration.

The articulated coupling apparatus 10 includes a bearing assembly 40. Such bearing assembly 40 includes a substantially spherical member 42. At least a predetermined portion of such spherical member 42 is positioned within such aperture 16 formed through the predetermined portion of the second end 14 of the male connection member 20. Such spherical member 42 has a predetermined diameter. In the presently preferred embodiment, the spherical member 42 includes a pair of axially-opposed flat surfaces 61. Such bearing assembly 40 has a race assembly 44, having a substantially spherical inner surface positioned around such predetermined portion of the spherical member 42, is positioned within the aperture 16 to enable movement of such male connection member 20 in relation to such female connection member 30 in both a vertical direction and a horizontal direction over a predetermined range. Such race assembly 44 includes an outer surface which is substantially identical to such predetermined size and such predetermined shape of such aperture 16 formed through the predetermined portion of said second end 14 of the male connection member 20.

A first securing means, generally designated 60, is engageable with each of such race assembly 44 and such second end 14 of said male connection member 20 for securing this race assembly 44 and the spherical member 42 to such second end 14 of said male connection member, 20.

A pair of shaft members 46 extend outwardly a predetermined length from axially-opposed surfaces of such spherical member 42. One of such pair of shaft members 46 being engaged in a respective one of such opening 38 formed through such each one of such pair of side wall portions 36 of such cavity 26 formed in the second end of such female connection member 30. At least a portion of each of such pair of shaft members 46 having a substantially identical configuration as at least a portion of such predetermined configuration of such opening 38 formed through such side wall portions 36.

A second securing means, generally designated 50, is engageable with at least one of such pair of shaft members 46 and a portion of such opening 38 formed through such side wall portions 36 for securing such bearing assembly 40 to such female connection member 30 and thereby securing the male connection member 20 to such female connection member 30 to form the articulable-type coupling apparatus 10 of the instant invention.

In one form of the invention, such substantially spherical inner surface of the race assembly 44 will have a substantially identical radius as the radius of such spherical member 42.

In the most preferred embodiment of the invention, however, such substantially spherical inner surface of such race assembly 44 will be slightly larger than the radius of such spherical member 42. In this case, such articulable-type coupling apparatus 10 further includes a lubricating liner 48 disposed intermediate such inner surface of the race assembly 44 and the spherical member 42.

It is presently preferred that such lubricating liner 48 will be formed in at least two pieces. It is also preferred that such lubricating liner 48 be bonded to such inner surface of the race assembly 44. Such bonding of such lubricating liner 48 to such inner surface of the race assembly 44 preferably being accomplished by an adhesive material.

According to the present invention, the bottom wall portion 32 of such cavity 26 formed in the second end of such female connection member 30 further includes a center plate member 52 which matingly-engages a center bowl (not shown) of a bolster portion (not shown) of a railway car truck (not shown). Such center plate member 52 includes a vertically-disposed hole 54 adjacent a bottom surface 56 thereof. Such hole 54 is located substantially in the center of such center plate member 52.

Additionally, the articulable-type coupling apparatus 10 further includes a vertically-disposed pin member (not shown) which is engageable in such hole 54 in said center plate member 52 and a vertically-disposed hole (not shown) in such center bowl of such bolster.

It is presently preferred that the bottom surface 56 of such center plate member 52, which is a bearing surface, be hardened to at least about 375 Brinell for a depth of at least about one-eighth inch.

Further, such center plate member 52 is substantially round, and a vertically-disposed side 58 thereof is hardened to a Brinell hardness of at least about 300 for a distance of at least about one-inch up from said bottom surface 56 and to a depth of about one-eighth inch.

In the presently preferred embodiment of this invention, the second end 14 of such male connection member 20 has a predetermined configuration adjacent an outermost end 18 thereof. This predetermined configuration of such outermost end 18 of said second end 14 of such male connection member 20 is a substantially convex shape in each of a vertically-disposed plane and a horizontally-disposed plane.

In addition, it is preferred that the vertically-disposed back wall portion 34 of such cavity 26 formed in said second end of such female connection member 30 has a predetermined configuration. This predetermined configuration of such vertically-disposed back wall portion 34 of said cavity 26 is a substantially concave shape in at least one of a vertical plane and a horizontal plane.

In this embodiment of the invention, it is also preferred that the predetermined shape of the aperture 16 formed through such predetermined portion of the second end 14 of such male connection member 20, is substantially round. Additionally, this aperture 16 includes a beveled portion 59 adjacent at least one predetermined outer surface thereof.

In this case, the race assembly 44 includes a complementary beveled ledge portion 62 which abuttingly-engages such beveled portion 59 adjacent such at least one predetermined outer surface of such aperture 16 formed through the predetermined portion of such second end 14 of such male connection member 20.

Furthermore, it is preferred that such race assembly 44 be formed in at least two pieces, which two pieces would be substantially identical.

It is likewise preferred that such spherical member 42 and such pair of shaft members 46, forming a portion of the bearing assembly 40 of such articulated coupling apparatus 10, be formed as a single piece.

The first securing means 60, engageable with each of such race assembly 44 and such second end 14 cf the male connection member 20, can be a weldment or a plate member (not shown) bolted to such second end 14 of such male connection member 20.

In the preferred embodiment of this invention, such pair of vertically-disposed side wall portions 36 include a tapered portion adjacent the front surface of such cavity 26 and adjacent such vertically-disposed back wall portion 34 of such cavity 26 to enable the second end 14 of such male connection member 20 to rotate about such spherical member 42 in a horizontal direction.

Finally, the predetermined configuration of such opening 38 formed through such each pair of vertically-disposed side wall portions 36 at least includes a generally round portion engageable with a portion of a respective one of such pair of shaft members 46.

Figure 3:
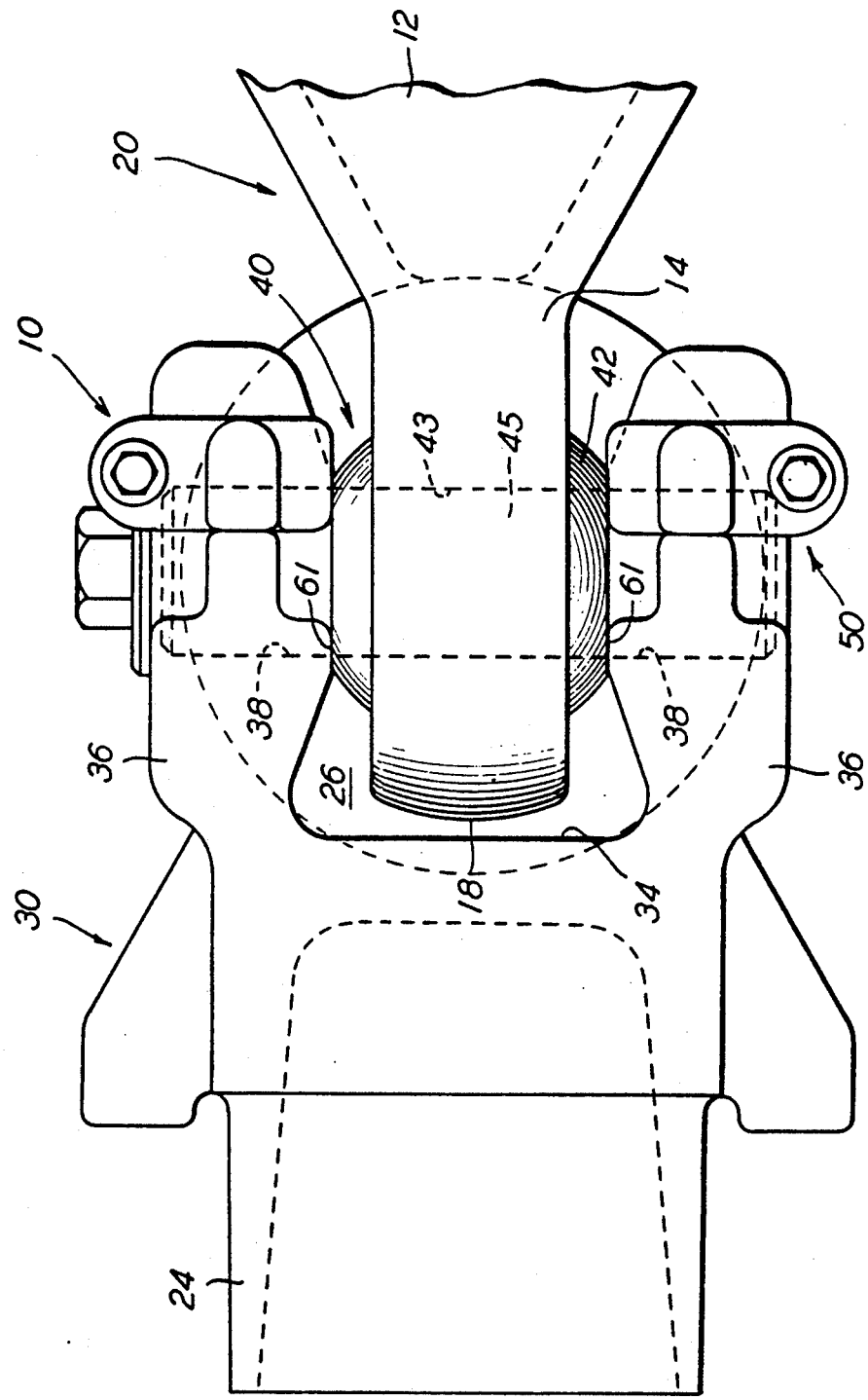
FIG. 3 is a top view which illustrates an alternative embodiment of a bearing assembly for use in an articulable coupling apparatus.
Figure 4:
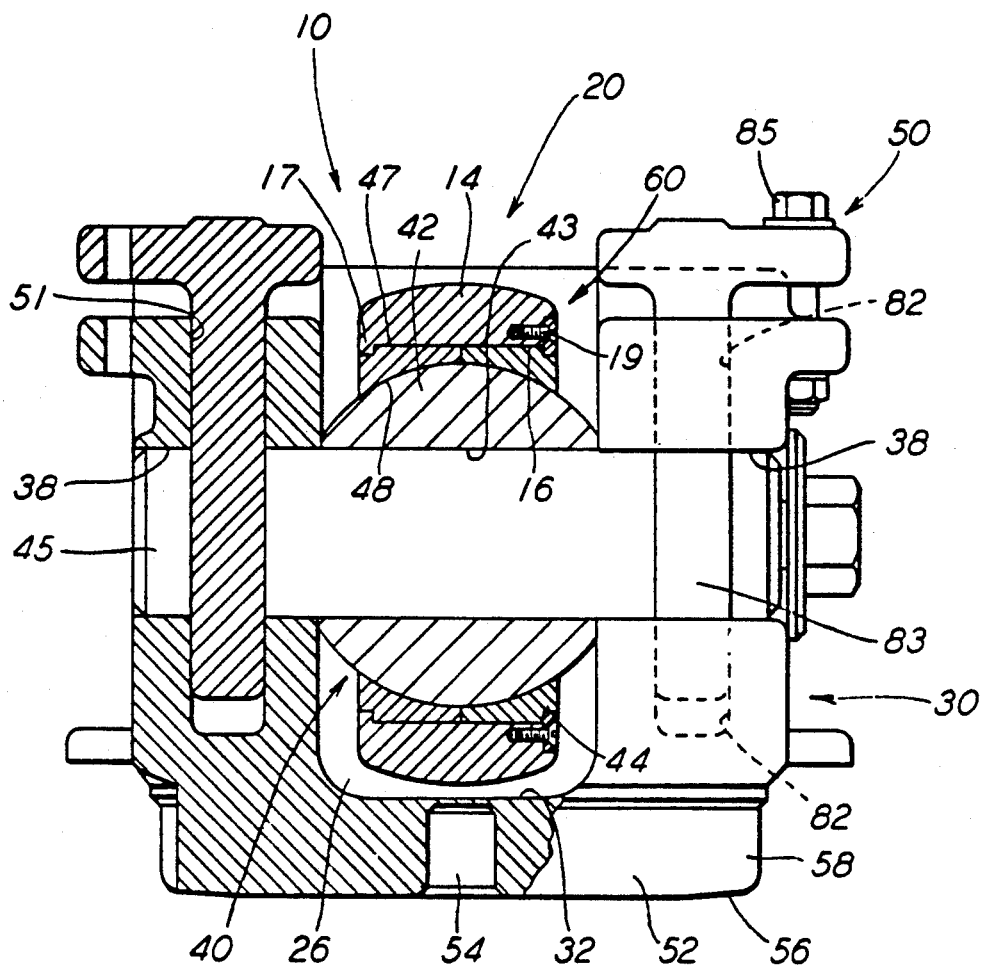
FIG. 4 is a cross-sectional view taken along lines IV—IV of FIG. 3.
Figure 5:
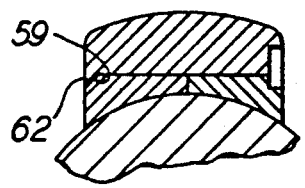
FIG. 5 is a partial view in cross-section through the male connection member and the bearing race.

In the alternative embodiment of the bearing assembly 40 illustrated in FIGS. 3 and 4, such bearing assembly 40 includes a substantially spherical member 42. At least a predetermined portion of such spherical member 42 is positioned within such aperture 16 formed through the predetermined portion of the second end 14 of the male connection member 20. Such spherical member 42 has a predetermined diameter.

A bore 43 is formed through such spherical member 42. The bore 43 has each of a predetermined size and a predetermined shape. A longitudinal axis of such bore 43 lies in a substantially horizontal plane.

A pin member 45, which has a horizontally-disposed axis, is provided. Such pin member 45 extends through the bore 43 in such spherical member 42 for a predetermined length on each side of axially-opposed surfaces of such spherical member 42. A portion of such pin member 45 is disposed within the bore 43 of the spherical member 42 and has a substantially identical size and a substantially identical shape as the predetermined size and predetermined shape of such bore 43 thereby enabling a press-fit. At least a portion of such predetermined length on each side of such spherical member 42, which engages at least a portion of such opening 38 formed through such pair of side wall portions 36, has a substantially identical size and identical configuration as such predetermined configuration of the opening 38.

A race assembly 44, having a substantially spherical inner surface positioned around such predetermined portion of the spherical member 42, is positioned within the aperture 16 to enable movement of such male connection member 20 in relation to such female connection member 30 in both a vertical direction and a horizontal direction over a predetermined range. Such race assembly 44 includes an outer surface which is substantially identical to such predetermined size and such predetermined shape of such aperture 16 formed through the predetermined portion of said second end 14 of the male connection member 20.

While a number of embodiments of the bearing assembly for use in an articulated coupling apparatus, constructed according to the present invention, have been described in detail above, it should be obvious to persons skilled in the railway coupling art that various other modifications and adaptations of such articulated coupling apparatus can be made without departing from the spirit and scope of the appended claims.

We claim:

1. A bearing assembly for use in an articulated coupling arrangement utilized in connecting adjacent ends of a pair of railway cars in a substantially semipermanent manner, such articulated coupling arrangement has a male connection member secured to one predetermined end of a first railway car and a female connection member secured to an adjacent predetermined end of a second railway car, said bearing assembly comprising;
   (a) a substantially spherical member having a predetermined diameter;
   (b) a race assembly formed by at least two members, each of said at least two members forming said race assembly having a substantially spherical inner surface positioned around a predetermined portion of said spherical member, an outer surface of said race assembly having a substantially identical size and a substantially identical configuration as a predetermined size and a predetermined configuration of an aperture formed through a predetermined portion in one end of such male connection member when said at least two members forming said race assembly are positioned around said predetermined portion of said spherical member, said race assembly enables movement of such male connection member in relation to such female connection member in both a vertical direction and a horizontal direction over a predetermined range of angles measured from a centerline of said spherical member disposed in a vertical direction, and from a longitudinal axis of such articulated coupling arrangement disposed in a horizontal direction;
   (c) securing means engageable with each of said race assembly and such one end of such male connection member for securing said race assembly and said spherical member to such one end of such male connection member; and
   (d) a pair of shaft members extending outwardly a predetermined length from axially-opposed surfaces of said spherical member, a longitudinal axis of said pair of shaft members being in a substantially horizontal plane, one of said pair of shaft members being engageable with a respective one of an opening formed through each of a pair of upstanding side wall portions of a cavity formed in one end of such female connection member, at least a first portion of each of said pair of shaft members having a substantially identical configuration as at least a portion of a predetermined configuration of such opening formed through such side wall portions of such cavity, at least a second portion of each of said pair of shaft members having a substantially flat surface area to be engaged by a wedge member to secure said pair of shaft members to such female connection member.

2. A bearing assembly for use in an articulable-type coupling apparatus, according to claim 1, wherein said substantially spherical inner surface of said race assembly has a substantially identical radius as a radius of said spherical member.

3. A bearing assembly for use in an articulable-type coupling apparatus, according to claim 1, wherein said substantially spherical inner surface of said race assembly is slightly larger than a radius of said spherical member, and said bearing assembly for use in said articulable-type coupling apparatus further includes a lubricating liner disposed intermediate said inner surface of said race assembly and said spherical member.

4. A bearing assembly for use in an articulable-type coupling apparatus, according to claim 3, wherein said lubricating liner is formed in at least two pieces.

5. A bearing assembly for use in an articulable-type coupling apparatus, according to claim 4, wherein said lubricating liner is bonded to said inner surface of said race assembly.

6. A bearing assembly for use in an articulable-type coupling apparatus, according to claim 5, wherein said lubricating liner is bonded to said inner surface of said race assembly by an adhesive.

7. A bearing assembly for use in an articulable-type coupling apparatus, according to claim 6, wherein said race assembly includes a beveled ledge portion which abuttingly-engages a complimentary beveled portion adjacent at least one predetermined outer surface of such aperture formed through a predetermined portion of such one end of such male connection member.

8. A bearing assembly for use in an articulable-type coupling apparatus, according to claim 7, wherein said spherical member and said pair of shaft members forming a portion of said bearing assembly are formed as a single piece.

9. A bearing assembly for use in an articulable-type coupling apparatus, according to claim 7, wherein said spherical member includes a bore formed therethrough and said pair of shaft members are formed by a pin member extending through said bore.

10. A bearing assembly for use in an articulable-type coupling apparatus, according to claim 6, wherein said race assembly is formed in at least two substantially identical pieces.

11. A bearing assembly for use in an articulable-type coupling apparatus, according to claim 6, wherein said spherical member and said pair of shaft members forming a portion of said bearing assembly are formed as a single piece.

12. A bearing assembly for use in an articulable-type coupling apparatus, according to claim 6, wherein said spherical member includes a bore formed therethrough and said pair of shaft members are formed by a pin member extending through said bore.

13. A bearing assembly for use in an articulable-type coupling apparatus, according to claim 4, wherein said spherical member and said pair of shaft members forming a portion of said bearing assembly are formed as a single piece.

14. A bearing assembly for use in an articulable-type coupling apparatus, according to claim 3, wherein said spherical member and said pair of shaft members forming a portion of said bearing assembly are formed as a single piece.

15. A bearing assembly for use in an articulable-type coupling apparatus, according to claim 3, wherein said spherical member includes a bore formed therethrough and said pair of shaft members are formed by a pin member extending through said bore.

16. A bearing assembly for use in an articulable-type coupling apparatus, according to claim 1, wherein said race assembly includes a beveled ledge portion which abuttingly-engages a complimentary beveled portion adjacent at least one predetermined outer surface of such aperture formed through a predetermined portion of such one end of such male connection member.

17. A bearing assembly for use in an articulable-type coupling apparatus, according to claim 1, wherein said at least two members forming said race assembly are substantially identical.

18. A bearing assembly for use in an articulable-type coupling apparatus, according to claim 17, wherein said spherical member includes a bore formed therethrough and said pair of shaft members are formed by a pin member extending through said bore.

19. A bearing assembly for use in an articulable-type coupling apparatus, according to claim 1, wherein said spherical member and said pair of shaft members forming a portion of said bearing assembly are formed as a single piece.

20. A bearing assembly for use in an articulable-type coupling apparatus, according to claim 1, wherein said spherical member includes a bore formed therethrough.

21. A bearing assembly for use in an articulable-type coupling apparatus, according to claim 20, wherein said pair of shaft members are formed by a pin member extending through said bore.

* * * * *

UNITED STATES PATENT AND TRADEMARK OFFICE
CERTIFICATE OF CORRECTION

PATENT NO. : 5,172,819
DATED : December 22, 1992
INVENTOR(S) : David Daugherty, Jr. et al.

It is certified that error appears in the above-identified patent and that said Letters Patent is hereby corrected as shown below:

Column 8, line 12, delete "cf" and insert --of--.

Signed and Sealed this

Seventh Day of December, 1993

Attest:

BRUCE LEHMAN

*Attesting Officer*     *Commissioner of Patents and Trademarks*